United States Patent [19]

Fox

[11] 4,242,789
[45] Jan. 6, 1981

[54] METHOD FOR MAKING AN IMPROVED MAGNETIC ENCODING DEVICE

[75] Inventor: Richard J. Fox, Oak Ridge, Tenn.

[73] Assignee: The United States of America as represented by the United States Department of Energy, Washington, D.C.

[21] Appl. No.: 21,291

[22] Filed: Mar. 16, 1979

[51] Int. Cl.³ .............................................. B23D 11/02
[52] U.S. Cl. .................................... 29/446; 29/469.5; 235/493; 365/133; 360/2
[58] Field of Search ............... 29/446, 469.5; 235/493; 365/133, 135; 360/2

[56] References Cited

U.S. PATENT DOCUMENTS

| | | | |
|---|---|---|---|
| 3,676,644 | 7/1972 | Vaccaro et al. | 235/493 X |
| 3,774,179 | 11/1973 | Wiegand | 365/133 |
| 3,774,180 | 11/1973 | Wiegand | 365/86 |
| 3,780,313 | 12/1973 | Wiegand | 365/133 X |
| 3,783,249 | 1/1974 | Wiegand | 360/2 X |
| 3,818,465 | 1/1974 | Wiegand | 365/133 |
| 3,820,090 | 1/1974 | Wiegand | 365/133 |
| 3,866,193 | 2/1975 | Wiegand | 365/133 |
| 3,892,118 | 7/1975 | Wiegand | 72/371 |

OTHER PUBLICATIONS

K. J. Sixtus et al., Physical Review, Apr. 1931, vol. 3, pp. 930–958.
Stress and Magnetostriction, Richard M. Bozorth, printed 3/1951–6th Reprint, pp. 610–611.

Primary Examiner—Charlie T. Moon
Attorney, Agent, or Firm—James E. Denny; Stephen D. Hamel; David E. Breeden

[57] ABSTRACT

A magnetic encoding device and method for making the same are provided for use as magnetic storage mediums in identification control applications which give output signals from a reader that are of shorter duration and substantially greater magnitude than those of the prior art. Magnetic encoding elements are produced by uniformly bending wire or strip stock of a magnetic material longitudinally about a common radius to exceed the elastic limit of the material and subsequently mounting the material so that it is restrained in an unbent position on a substrate of nonmagnetic material. The elements are spot weld attached to a substrate to form a binary coded array of elements according to a desired binary code. The coded substrate may be enclosed in a plastic laminate structure. Such devices may be used for security badges, key cards, and the like and may have many other applications.

8 Claims, 7 Drawing Figures

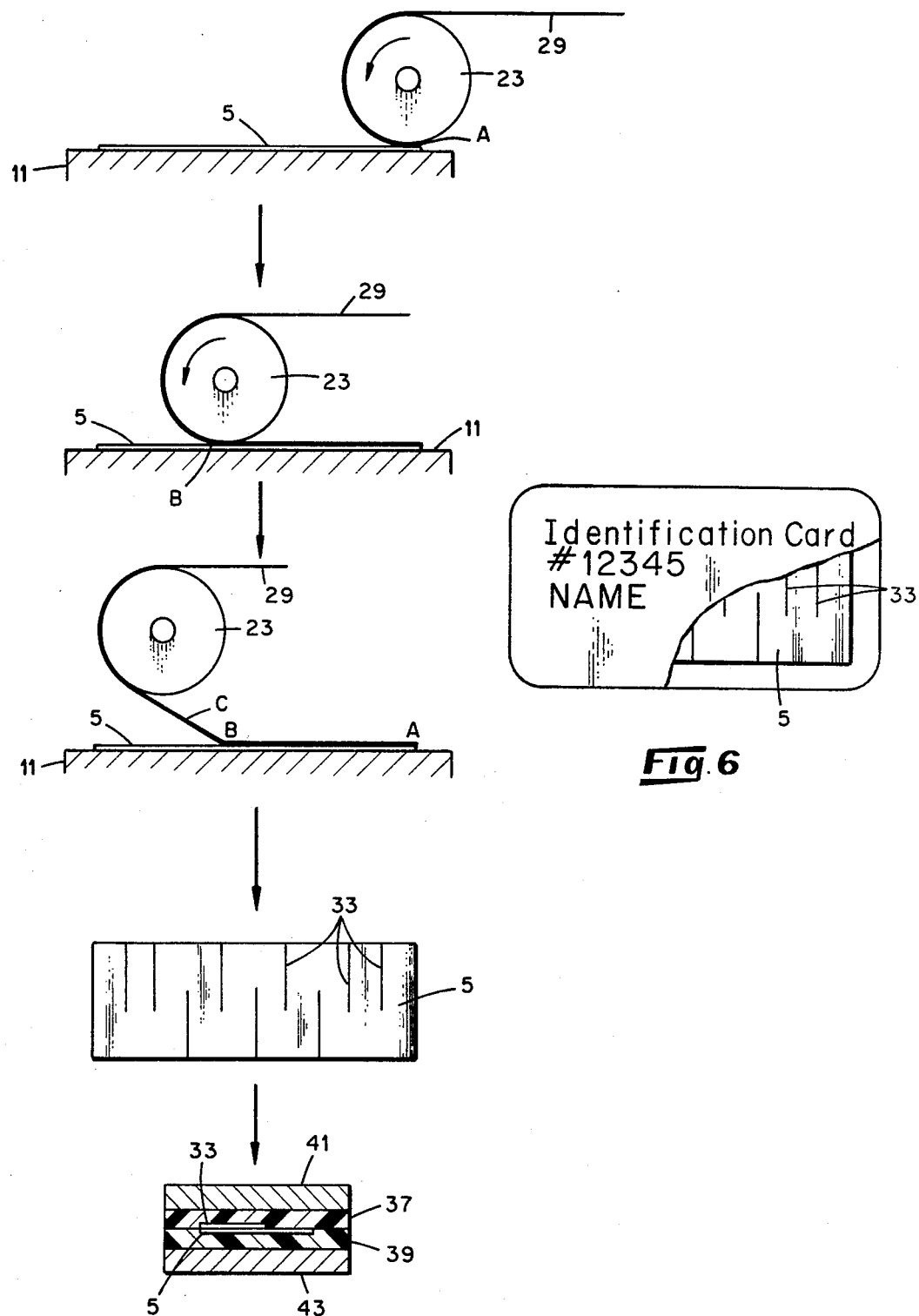

METHOD FOR MAKING AN IMPROVED MAGNETIC ENCODING DEVICE

This invention was made during the course of, or under, a contract with the U.S. Department of Energy.

BACKGROUND OF THE INVENTION

This invention relates generally to the art of magnetic coded data cards and the like and more specifically relates to improved magnetic encoding devices and the method for making the same.

It has long been known that discontinuities are created in magnetic hysteresis loops when magnetic materials are placed under the influence of any stress. Stressing may take the form of tension, torsion, or bending. These are known as Barkhausen discontinuities. This known property of magnetic materials has been utilized in the art to prepare magnetic encoding elements for use in coded identification cards, key cards, security control cards, etc. The material generally used for this application is a magnetic alloy called Vicalloy, a composition of vanadium, iron and cobalt. This alloy is a commercially available material which may be easily worked, drawn into wire form or rolled into strip form. This material has been used in magnetic encoding devices in wire form which is strained by repeated twisting of the wire while applying a longitudinal tensile force. This method creates different magnetic conditions in the shell of the wire as contrasted to the core. The magnetic properties along the wire may be varied, if desired, by radial compression, for example. Magnetic encoding elements formed in this manner are generally known in the art as Wiegand wires.

The Wiegand wires may be used for security control cards, credit cards, identification cards and the like. Numerous wires are embedded in the card in particular positions and orientations in accordance with a desirable digital or other code scheme. Such cards can then be moved past a reading head thereby generating electrical pulses that are related to the position and orientation of the wire whereby "unique signatures" are achieved.

The Wiegand wires are formed by cyclic torsional strain and longitudinal strain to provide a bistable magnetic wire switching element having permanently different shell and core magnetic properties. The wire is circumferentially strained in alternate clockwise and counterclockwise directions while maintaining axial tension on the wire. The result is a wire which has a relatively harder magnetic shell and a relatively softer magnetic core and once magnetized the shell becomes a permanent magnet and the core, being softer, is magnetically captured by the shell to provide a return path of the lines of flux generated by the shell. When the wire is subjected to an increasing external magnetic field, a threshold is reached where the external magnetic field suddenly and rapidly captures the core to provide a low reluctance path for its flux. If the polarity of the external field is opposite from that of the shell, then the flux from the shell must be completed in the space around the wire. A pickup coil will produce a pulse in response to the sudden change in the flux pattern. Wires produced in this manner are placed in an unstrained orientation on a substrate or laminated card oriented in a first or second direction, respectively, depending upon a desired binary code to be placed on the card. These cards may then be inserted into a reader which has permanent magnets of properly oriented poles to produce the opposing magnetic flux necessary to switch or capture the cores, thereby producing pulses in adjacent pickup coils oriented to sense the sudden switch in the core magnetization direction. When these wires are removed from the reader, they revert to their original state by the outer core recapturing the center core. Wires manufactured in this manner are very difficult to produce requiring a substantial amount of equipment to properly torsion and stress the wires to produce the desired magnetic effects set out above. Further, it is difficult to properly position these individual cut lengths of wires in the proper orientation on a card or other similar device in which they are used for magnetic encoding.

In view of these problems, there is a need for a much simpler method for producing encoded elements and assembling these elements into a coded arrangement as an integral part of a card or memory device.

SUMMARY OF THE INVENTION

In view of the above need, it is a primary object of this invention to provide a method for producing improved magnetic encoding devices which are easier to produce with consistent magnetic qualities and readily oriented into coded forms in a magnetic storage medium such as a magnetic key card, security badge, or the like.

Further, it is an object of this invention to provide a method for the production of improved characteristic magnetic encoding elements in the form of thin wires or strips of a ferromagnetic material that have been subjected to uniform unidirectional bending to exceed the elastic limit of the material and thereafter restrained in an unbent position on a nonmagnetic substrate.

Other objects and many of the attendant advantages of the present invention will be obvious from the following detailed description taken in conjunction with the drawings.

BRIEF DESCRIPTION OF THE DRAWINGS

FIG. 5 is a flow diagram illustrating the method of fabricating magnetic encoding elements and their incorporation into a magnetic encoding device in accordance with the present invention.

FIG. 6 is a cut-away view of a finished identification card showing the coded array of magnetic elements.

DETAILED DESCRIPTION

A short length of Vicalloy wire (10 wt.% V-52 wt.% Co-balance Fe) having a diameter of 0.010 inch (0.254 mm) was uniformly bent over a mandrel having a 0.2 inch (5.8 mm) radius of curvature. This radius was sufficient to stress the wire beyond its yield point and thus cause a permanent curvature of the wire. The wire was then held in an unbent orientation and subjected to an AC magnetic field (60 Hz) and the hysteresis loop studied.

Figure 1:
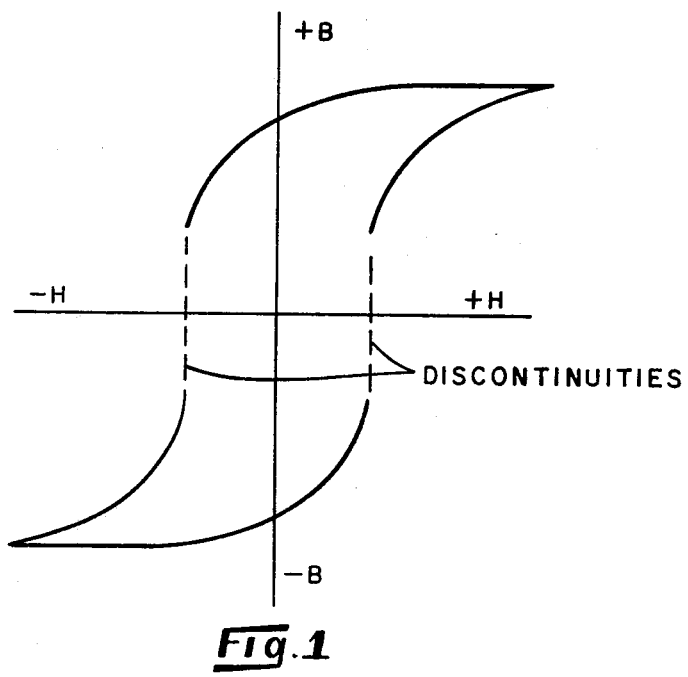
FIG. 1 is a typical hysteresis loop exhibited by strained ferromagnetic materials illustrating Barkhausen discontinuities.

As illustrated in FIG. 1, the prebent wire exhibited typical Barkhausen discontinuities. This is illustrated by the abrupt changes in the hysteresis loop shown by dashed lines when the prebent wire is subjected to a reverse magnetic field of sufficient magnitude once the wire has been magnetized in the opposite direction.

Figure 2:
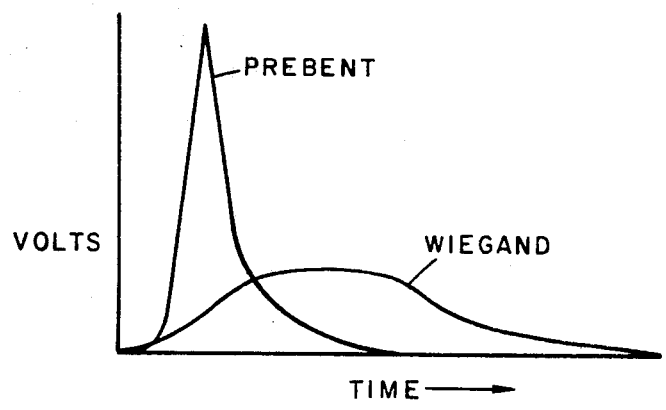
FIG. 2 is a graphic illustration showing relative pulse shapes of output pulses from the subject magnetic encoder elements as contrasted with those of the prior art.

Several prebent wires of this size were then mounted on a plastic card so as to be tested in a generally conventional "reading" unit. This unit, generally illustrated in FIG. 7, includes a first permanent magnet to magnetize the wire in the first direction and a second permanent magnet disposed parallel to the first magnet but having opposite magnetic polarity. A sensing coil is positioned to sense the change in the magnetic flux of the wire as it moves past the first magnet and becomes influenced by the flux field of the second magnet sufficient to rapidly reverse the magnetic polarity of the wire. The pulses produced as the prebent, but held straight, wires past the magnets and pick-up coil were compared with those of so-called Wiegand wires produced as described above. The shapes of the respective pulses are shown in FIG. 2. It will be seen that the prebent wire gives rise to a much narrower pulse than does a Wiegand wire. The rise time, being about a factor of 4 faster for the prebent wire, produces a corresponding increase in peak open circuit output voltage induced in the reader sensing coil.

The reasons for the faster rise time in a bent wire are not fully understood. One possible explanation is that magnetic flux reversal occurs initially along an element of the surface of the prebent wire (on the tension side) in contrast to centrally in the Wiegand wire. The surface reversal is thought to reduce the induced eddy currents and thus improve the rise time.

A 0.010 inch (0.254 mm) Vicalloy wire of 5/16 inch (8 mm) length was rolled without increasing the length to form a uniform ribbon 0.003 inch (0.076 mm) thick and 0.024 inch (0.61 mm) wide. This had about the same cross sectional area as the 0.010 inch wire. The result of the ribbon was uniformly bent to a 0.125 inch (3.6 mm) radius which was sufficient to exceed the yield point. The ribbon was then held in an unbent position and tested. The results were substantially as found with the prebent wires.

The ribbon material may be particularly significant with regard to manufacturing encoding elements for security badges or the like. The ribbon form permits the orientation to be predetermined and a flat stock piece of material formed, as by photoetching or punching, to provide fingers in that orientation. The bending of all fingers may be accomplished at one time in a bending operation and the total unit may then be inserted (in unbent position) in the security badge, card or the like.

It will be understood that the invention is not limited to the use of Vicalloy which may be readily machined, stamped or rolled to provide a desired orientation of an array of elements to be placed on a security badge or the like for coding. Other ferromagnetic materials, such as pure ferronickel, or nickel, may be used. Ferronickel or nickel, however, exhibit smaller discontinuities than the Vicalloy. For some applications, however, the pulses would be adequate. In addition, larger wires or thicker ribbons may be used. In such cases, a large radius of curvature would be used for bending the elements. In general, an increase in the cross sectional area of a wire or ribbon increases pulse rise time. However, since the prebent material typically exhibits a faster rise time than Wiegand wires, some increase in cross section is permissible.

What is desired in the prebent elements is a single region of compression on one side and a single region of tension on the opposite side. This ideal condition exists when the yield point is only moderately exceeded when bending. Severe bending may introduce multiple regions of tension and compression, thereby reducing the magnitude of output pulses. The extent of bending to achieve yield will depend, of course, upon the particular strength of the material being used for the encoder elements.

In large scale manufacture of stock material for the encoder elements, wire of desired composition may be wound as a coil upon a mandrel of appropriate size to achieve the desired yield in the material. Short lengths of the bent wire would then be prepared and inserted in a badge, etc. This may be accomplished using conventional laminating procedures whereby the wire would be held in a straightened condition. It may be desirable to provide a hook-like bend in one end of the wire to be inserted in a small hole in one layer of the laminate thereby the wire will not shift position during lamination.

The elements may also be manufactured from ribbon stock. Units may be cut so that the ultimate active portions of the encoder element will be formed along the direction of rolling used in the stock. Several fabrication methods may then be followed. One involves photoetching to produce the active elements extending from an edge piece so as to resemble a comb structure. Further, the arrangement may be fabricated using milling, stamping or the like to cut away undesired portions to form the comb or other convenient structure. In either case, bending may be performed either before or after producing the desired pattern of the comb or ladder-like arrangement.

Figure 3:
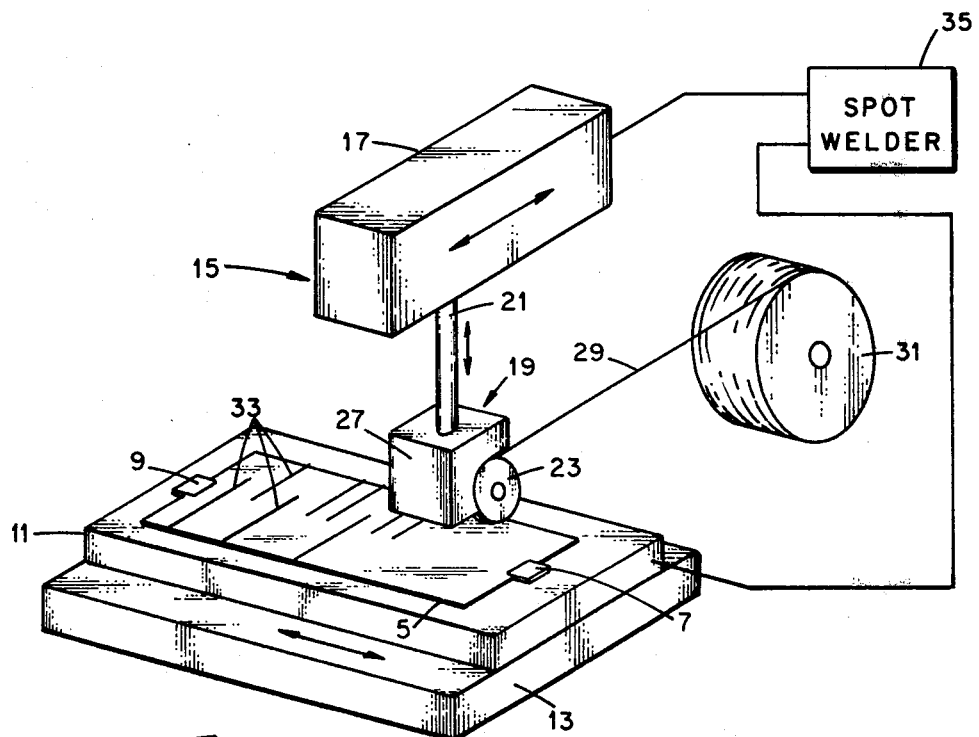
FIG. 3 is a schematic illustration of a system for bending wire or strip magnetic material and applying the material to a non-magnetic substrate in an unbent orientation.

Referring now to FIG. 3, there is shown schematically, a system for bending wire or strip magnetic material and applying the material to a non-magnetic substrate in proper bit positions according to a desired binary code. The non-magnetic substrate 5 is clamped by means of conventional clamping mechanisms 7 and 9 to an electrically conductive base plate 11. The base plate 11 may be constructed of copper, for example, and mounted on an indexing table 13 which allows an operator to laterally index the plate 5 relative to a wire or strip applicator assembly 15.

Figure 4:
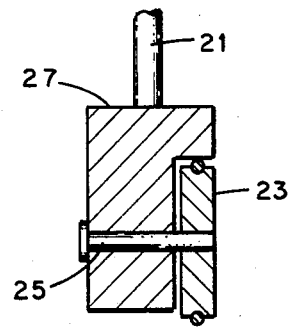
FIG. 4 is a sectional elevational view of the roller assembly of FIG. 3.

The applicator assembly 15 includes a position control head 17 which carries a shrouded roller assembly 19 attached at the lower end of a reciprocally positionable shaft 21 operatively carried by the control head 17 for raising and lowering the roller assembly 19. As may be seen more clearly in the sectioned elevational view of the roller assembly 19 in FIG. 4, the shrouded roller assembly includes a grooved roller 23 attached to a bearing shaft 25 rotatably carried by a shroud 27. Since a welding current is supplied through the shaft 21, shroud 27, and bearing shaft 25 to the roller 25 which acts as one electrode of a spot welder, the bearing shaft 25 is preferably constructed of phosphor bronze and lubricated with graphite to allow conduction of the welding current through the bearing. The magnetic wire or strip material 29 may be fed from a supply spool 31 and around the shrouded roller 23 to provide the uniform bending operation of the wire as the roller 23 is advanced across the substrate 5 during application of the magnetic wire encoding elements 33 to the non-magnetic substrate 5. The depth of the groove in the rotor 23 is approximately one-half the wire diameter and the spacing between the roller and the shroud is approximately one-half the wire diameter so that the wire freely passes around the roller, but is constrained to bend uniformly about the roller radius to provide the uniform bending step prior to restraining the wire in the unbent state on the substrate 5 according to the process described below.

To spot weld the ends of the elements 33 to the substrate 5, the roller assembly is first lowered to press the wire against the substrate at the edge thereof and weld current is supplied through the roller 23. The position control head is then moved laterally of the substrate 5 to roll out the wire onto the substrate the desired length and a second weld is made.

The weld current may be supplied in various ways. As illustrated here a spot welding unit 35 is connected with the positive lead to the roller 23 through connection to the shaft 21 within the control head 17 and the ground lead is connected to the copper base plate 11. The operator activates the welder at each welding location to secure the elements 33 ends to the substrate thus restraining the prebent wire in an unbent uniformly stressed position on the non-magnetic substrate.

Referring now to FIG. 5, wherein there is shown a simplified flow diagram of the preferred method for manufacturing the encoding devices and arranging them on a finished coded identification card, the process will be described in detail. A ferromagnetic wire or ribbon 29 is passed around the grooved ¼' diameter copper roller 23 which, as pointed out above, serves as one electrode of a spot welder. Preferably annealed Vicalloy wire 0.010 inch in diameter or ribbon 0.005 inch thick by 0.015 inch wide is used. The wire is first welded to a 0.010 non-magnetic stainless steel strip 5 at point A and the roller is then advanced to point B and a second weld is made. The roller assembly is lifted and the wire is cut at point C. This segment A-B constitutes one binary bit. It can be seen that the wire is uniformly prebent and then held straight in a single operation. The process is repeated at other locations on the stainless steel strip to produce the desired number of elements 33 or bits for the particular binary coded array.

By experiment it was found that elements slightly longer than ½ the original length provide larger signals than obtained from only ½ the length. This provides a partially interleaved array of elements 33 along the pattern. This arrangement is less susceptible to errors in reading the code in readout equipment, as described below, due to alignment of the finished card with the reader. Plastic laminants 37 and 39 are heat sealed to enclose the coded assembly by means of heated platens 41 and 43. The plastic laminants 37 and 39 may take various forms according to the outer card configuration. Identification information may be printed in a stamped or laminated manner on the card, as shown. A typical example of a finished identification card made by this process as shown in FIG. 6 which is broken away to show the interleaved array of code elements 33 on the substrate 5.

Figure 7:
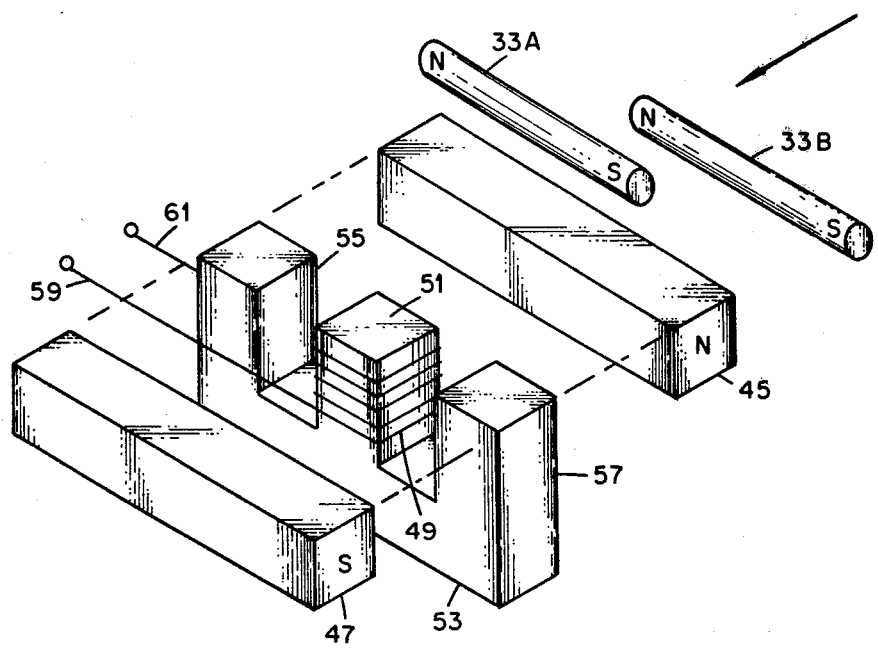
FIG. 7 is a perspective representation of a reading device which may be used in conjunction with the magnetic encoded cards produced as illustrated in FIG. 5 to read the coded information from the card.

The preferred form of the reader for such an encoded card, badge, etc., is illustrated in FIG. 7. Two small permanent magnets 45 and 47 are positioned closely to a sensing coil 49. The magnets 45 and 47 are aligned so as to be parallel to code elements 33A and 33B. The permanent magnets 45 and 47 are oriented so as to have opposite magnetic polarity. The sensing coil 49 is wound on a central leg 51 of a generally E-shaped iron yoke 53. The yoke 53 has outer legs 55 and 57 of equal height to that of the central leg 51. Leads 59 and 61 connect the coil 49 to any desired circuitry which may be used for decoding information on the card when it is passed by the reader. As the partially interleaved encoder elements are passed through this reader in the direction as shown by the arrow, element 33A first encounters magnet 45 thereby inducing a magnetic polarity in element 33A opposite to that of magnet 45. As the element 33A then enters the influence of the field of magnet 47, the magnetic polarity of element 33A suddenly reverses. This sudden reversal induces a magnetic field in legs 51 and 55 of the yoke 53 and thereby produces a pulse of a first polarity across output leads 59 and 61. Similarly, magnet 45 induces a magnetic polarity in element 33B, as shown. When element 33B enters the influence of the field of magnet 47, magnetic polarity is reversed in element 33B. This change gives rise to an induced magnetic field in legs 51 and 57 of the yoke 53. Since the flux cutting the coil 49 is opposite in direction to that from the element 33A, a pulse at leads 59 and 61 of opposite polarity is provided.

From the foregoing, it may be seen that encoding elements 33A extending from one side of the array create voltage signals of the first polarity and may be used, for example, as "zeros" in a binary system. The voltage signals created by encoding elements 33B extending from the other side of the array are then decoded as "ones" in the binary system. Accordingly, for example, a group of four elements 33 may be arranged to uniquely define any binary numeral of 0 to 9. Thus, a thirty-four element array may be coded for an eight digit number (using 32 elements for the number), and the first and last element of the array may be used for an "on" and an "off" voltage signal. These signals may be used in various means known in the art to decode the signal encoded by the array of the elements 33 on the card.

The reader illustrated in FIG. 7 including the magnets 45 and 47, and yoke assembly 53 may be permanently placed for proper relative spacing of the elements in various reading arrangements for reading identification cards such as shown in FIG. 6. These various arrangements and circuitry for decoding the digital information encoded on the magnetic medium are well known in the art and need not be further described herein for a full understanding of the invention.

As used herein, the term "exceed" as applied to the yield point during bending is meant to mean, as an optimum, an amount such that a maximum fraction of the cross sectional area of the elements 33 have a uniformly distributed residual tensile stress along their length after the uniformly bent wires or strips are in a flat orientation on the substrate 5. The optimum value of strain above the yield point will be different for each material, (i.e., the value for nickel will be different than that for Vicalloy) as well as for each thickness of material (and perhaps for different heat treatment, etc.). A value below the optimum will reduce the magnitude of an output pulse from the reader such that, at low values of stress, the ratio of the pulse with respect to noise will be too low for practical use. A value above the optimum for a specific material again reduces the pulse as well as often creates multiple pulses due to multiple regions of tension in the elements. Such multiple pulses prevent the proper identification of the code established by the individual elements 33.

Thus, it will be seen that a very useful and improved magnetic encoding device and a simplified process for manufacturing such an encoding device has been provided with an increase in the output signal level of the pulses provided by each of the elements of the array that have shorter rise time and a fourfold increase in amplitude as compared to those of the known prior art. Although the invention has been illustrated by means of a specific embodiment of the device, the method for making the device and the apparatus for reading the information from the device, it will be obvious to those skilled in the art that various modifications and changes may be made without departing from the spirit and scope of the invention as set forth in the following claims attached to and forming a part of this specification.

What is claimed is:

1. A method of making an improved magnetic encoding device having at least one element of magnetic material for use as a magnetic storage medium, comprising the steps of:
   bending said element uniformly along the length thereof by passing said element about a roller having a radius sufficient to bend said element along a common radius of curvature sufficient to exceed the yield point of said element;
   attaching the free end of said element passing about said roller to a non-magnetic substrate;
   advancing said roller over said substrate to extend said element in an unbent orientation a desired length thereover; and
   restraining the prebent element in an unbent orientation on said substrate by attaching said element to said substrate at said desired length position so that a uniform stress is produced in said element along said desired length thereof.

2. The method as set forth in claim 1 wherein said elements comprise lengths of wire formed of a magnetic material.

3. The method as set forth in claim 1 wherein said elements comprise lengths of strips formed of a magnetic material having a length greater than the width thereof.

4. The method as set forth in claim 1 wherein said at least one element includes a plurality of elements and further comprising the steps of repeating the steps of claim 1 at selected parallel bit positions along said substrate to produce a desired binary coded array of elements on said substrate.

5. The method as set forth in claim 4 wherein said substrate is in the form of an elongated strip and said bit positions extend transversely of said substrate and wherein said elements for bit positions indicative of a first binary state extend from one edge of said strip to a point substantially greater than half the distance across said substrate, and said elements for bit positions indicative of a second binary state extend from the other edge of said substrate to a point substantially greater than half the distance across said substrate to form a partially interleaved binary coded array of elements on said substrate.

6. The method as set forth in claim 5 wherein said substrate is formed of an electrically conductive material and said elements are attached to said substrate by spot welding their respective ends to said substrate.

7. The method as set forth in claim 6 further including the step of enclosing said substrate in a laminated covering.

8. The method as set forth in claim 7 wherein said magnetic material is Vicalloy and said substrate is made of stainless steel.

* * * * *